(12) United States Patent
Hasegawa

(10) Patent No.: US 8,798,151 B2
(45) Date of Patent: Aug. 5, 2014

(54) VIDEO DISPLAY DEVICE, INTERPOLATED IMAGE GENERATION CIRCUIT AND INTERPOLATED IMAGE GENERATION METHOD

(75) Inventor: Takao Hasegawa, Hyogo (JP)

(73) Assignee: Panasonic Corporation, Osaka (JP)

( * ) Notice: Subject to any disclaimer, the term of this patent is extended or adjusted under 35 U.S.C. 154(b) by 1452 days.

(21) Appl. No.: 12/188,283

(22) Filed: Aug. 8, 2008

(65) Prior Publication Data

US 2009/0051819 A1 Feb. 26, 2009

(30) Foreign Application Priority Data

Aug. 20, 2007 (JP) .................................. 2007-213821

(51) Int. Cl.
| | | |
|---|---|---|
| *H04N 7/12* | (2006.01) | |
| *H04N 11/02* | (2006.01) | |
| *H04N 7/14* | (2006.01) | |
| *H04N 5/14* | (2006.01) | |
| *G06T 3/40* | (2006.01) | |
| *H04N 7/01* | (2006.01) | |
| *H04N 21/435* | (2011.01) | |

(52) U.S. Cl.
CPC ............... *H04N 7/014* (2013.01); *H04N 5/145* (2013.01); *G06T 3/4007* (2013.01); *H04N 7/0122* (2013.01); *H04N 21/435* (2013.01)
USPC .................................................... 375/240.16

(58) Field of Classification Search
CPC .............................. G06T 3/4007; H04N 5/145

USPC ...................................................... 375/240.16
See application file for complete search history.

(56) References Cited

U.S. PATENT DOCUMENTS

| | | | | |
|---|---|---|---|---|
| 5,488,419 A | * | 1/1996 | Hui et al. .................. | 375/240.17 |
| 2002/0015104 A1 | * | 2/2002 | Itoh et al. ...................... | 348/459 |
| 2005/0053159 A1 | * | 3/2005 | Sugimoto ................ | 375/240.26 |
| 2007/0273787 A1 | * | 11/2007 | Ogino et al. .................. | 348/441 |
| 2008/0025390 A1 | * | 1/2008 | Shi et al. .................. | 375/240.02 |

FOREIGN PATENT DOCUMENTS

| | | |
|---|---|---|
| JP | 2003-274414 | 9/2003 |
| JP | 2005-6275 | 1/2005 |
| JP | 2005-122199 | 5/2005 |
| JP | 2007-318193 | 12/2007 |

\* cited by examiner

*Primary Examiner* — Mark Rinehart
*Assistant Examiner* — Maharishi Khirodhar
(74) *Attorney, Agent, or Firm* — Wenderoth, Lind & Ponack, L.L.P.

(57) ABSTRACT

A video display device displays a video distributed via broadcast. The video display device comprises a data extraction section and a frame interpolation processing section. The data extraction section extracts additional data indicating information regarding a program or regarding a video of the program from a broadcast signal. The frame interpolation processing section generates an image of an interpolated frame based on images of respective frames, each of the images is represented by video data extracted from the broadcast signal. Furthermore, the frame interpolation processing section determines a content of a process regarding a motion vector to be used for generating the interpolated frame based on a content of the additional data extracted by the data extraction section.

3 Claims, 9 Drawing Sheets

VIDEO DISPLAY DEVICE, INTERPOLATED IMAGE GENERATION CIRCUIT AND INTERPOLATED IMAGE GENERATION METHOD

BACKGROUND OF THE INVENTION

1. Field of the Invention

The present invention relates to a video display device and an interpolated image generation circuit, and more particularly to a video display device and an interpolated image generation circuit that generate an image of an interpolated frame based on images of respective frames acquired from a broadcast signal.

2. Description of the Background Art

Conventionally, in order to improve the problems of a liquid crystal display television such as the blurring in a moving picture, for example, there is a technique in which a video is displayed at a frame rate higher than that of a video source by generating an interpolated frame (see patent document 1 (Japanese Laid-Open Patent Publication No. 2005-6275), for example). Generally, when generating an interpolated frame, a motion vector is searched for in the unit of a block based on images of frames immediately preceding and following an interpolated frame to be generated, so as to generate an image of the interpolated frame by using the motion vector.

In digital broadcast, video contents of various types are distributed in various forms. For example, the video contents to be broadcast have various types, and movement (change) of images is vigorous in some video contents such as a sport program, while in others, there is little movement of images. Furthermore, in digital broadcast, there may be a case where a frame rate of a video source tote distributed is different from the actual number of frames included in the video content. Specifically, in the case of a movie content, there may be a case where the same image may be consecutively used during two or three frames, thereby distributing a video having 24 frames per second as a video source having 60 frames per second. Still furthermore, among video sources to be distributed via digital broadcast, there may be a video source in which a size of a moving picture (aspect ratio) is 16:9, or there also may be a video source in which a fixed image (side panel) is attached to each of the left and right sides of a moving picture having a size of 4:3.

As described above, in digital broadcast, the video contents of various types are distributed in various forms. Thus, in the case where a frame interpolation process is performed, it may be considered that a content of an appropriate frame interpolation process is different depending on a content of a video source, the distribution form used for the video source, and the like. Therefore, for some video sources, the frame interpolation process may be inappropriate if the same content of the frame interpolation process is performed on all video sources, and thus a proper interpolated frame may not be generated.

SUMMARY OF THE INVENTION

Therefore, an object of the present invention is to provide a video display device, an interpolated image generation circuit or an interpolated image generation method capable of performing an appropriate frame interpolation process depending on a content of a video source and the like.

The present invention has the following features to attain the object mentioned above. That is, a first aspect is a video display device that displays a video distributed via broadcast. The video display device comprises a data extraction section and a frame interpolation processing section. The data extraction section extracts additional data indicating information regarding a program or regarding a video of the program from a broadcast signal. The frame interpolation processing section generates an image of an interpolated frame based on images of, respective frames, represented by video data extracted from the broadcast signal. Furthermore, the frame interpolation processing section determines, based on a content of the additional data extracted by the data extraction section, a content of a process regarding a motion vector to be used for generating the interpolated frame.

Note that "a process regarding a motion vector" mentioned above indicates a process such as a process to be executed for calculating a motion vector or a process to be executed by using the calculated motion vector, and includes at least the following processes:

A process of searching for a motion vector (first embodiment, third variant and fifth variant)

A process of determining a frame (or the number of frames) to be used for calculating a motion vector (second embodiment and fourth variant)

A process of determining whether or not a motion vector is calculated (third embodiment)

A process of generating an interpolated frame by blending an image generated by using a motion vector with an image interpolated between images of the respective frames (first variant)

A process of determining whether a portion of a video is static or dynamic by using a motion vector having been calculated (second variant)

A process of detecting the movement of an object included in a video by using a motion vector having been calculated (sixth variant)

In a second aspect, the data extraction section may extract data indicating information for specifying a program or a genre of the program as the additional data. In this case, the frame interpolation processing section determines, based on the additional data, the content of the process regarding the motion-vector.

In a third aspect, the frame interpolation processing section may determine, based on the additional data, a search range of the root ion vector to be used for generating the interpolated frame.

In a fourth aspect, the frame interpolation processing section may determine, based on the additional data, any of the frames to be used for calculating the motion vector.

In a fifth aspect, the frame interpolation processing section may determine, based on the additional data, whether a calculation process of the motion vector is executed.

In a sixth aspect, the frame interpolation processing section may determine, based on the additional data, a blending ratio of an image generated by using the motion vector to an image interpolated between the images of the respective frames.

In at seventh aspect, the frame interpolation processing section may determine, based on the additional data, a determination criterion for determining whether a portion of the video is static or dynamic.

In an eighth aspect, the frame interpolation processing section may determine, based on the additional data, contents of search processes in horizontal and vertical directions.

In a ninth aspect, the frame interpolation processing section may determine, based on the additional data, a number of frames to be used for calculating the motion vector.

In a tenth aspect, the frame interpolation processing section determines, based on the additional data, an area, included in an entirety of the video, in which a search is performed with a higher degree of precision than other areas.

In an eleventh aspect, the frame interpolation processing section may determine, based on the additional data, a size to be defined as a collective object in a search process of the motion vector.

In a twelfth aspect, the data extraction section may extract, as the additional data, area specification data for specifying an area, included, in an entire area of each of the images to be displayed on a display device, in which a moving picture is displayed. In this case, the frame interpolation processing section executes a calculation process of the motion vector only in the area specified by the area specification data.

In a thirteenth aspect, the area specification data may indicate an aspect ratio of each of the images represented by the video data. In this case, the frame interpolation processing section determines, based on the data indicating the aspect ratio, the area in which the calculation process of the motion vector is executed.

In a fourteenth aspect, the area specification data may indicate an area, included in the entire area of each of the images to be displayed on the display device, in which each of the images represented by the video data is displayed. In this case, the frame interpolation processing section determines, based on the area specification data, the area in which the calculation process of the motion vector is executed.

Furthermore, the present invention may be provided as an interpolated image generation circuit comprising the data extraction section and the frame interpolation processing section, or as an interpolated image generation method similar to that to be executed by the video display device.

According to the first aspect, the video display device is capable of performing a different content of an image generation process of the interpolated frame depending on a content of the additional data extracted by the broadcast signal. Specifically, a genre of a program to be broadcast or an area in which a moving image is actually displayed is determined by using the additional data, thereby making it possible to perform an appropriate frame interpolation process depending on the genre or the area mentioned above and thus performing the appropriate frame interpolation process depending on a content of a video source and the like.

According to the second aspect, it becomes possible to perform an appropriate frame interpolation process depending on the program or the genre of the program. Particularly, according to the third aspect, the search range of the motion vector is determined by the genre. Therefore, for example, it is possible to execute a process such that the search range is set to be broad for videos of a genre of sport in which movements are vigorous, while the search range is set to be narrow for videos of other genres. Furthermore, according to the fourth aspect, the frame to be used for generating the interpolated frame is determined based on the genre. Therefore, it becomes possible to identify a genre, such as movie, which needs to designate a frame to be used for generating the interpolated frame so as to be different from that designated in a normal case, and perform the frame interpolation process in a manner appropriate for the genre of movie. Furthermore, according to the fifth aspect, whether or not the image generation process of the interpolated frame is per formed is determined based on the genre. Therefore, for example, in a genre of animation where it is difficult to generate the interpolated frame with a high degree of precision, no frame interpolation process is performed, thereby making it possible to prevent an improper interpolated frame from being generated or displayed. Furthermore, according to the sixth to eleventh aspects, it becomes possible to properly perform the process regarding the motion vector depending on the program or the genre of the program.

According to the twelfth aspect, the area specification data is extracted as the additional data, thereby performing the frame interpolation process only in the area specified by the area specification data. Thus, it becomes possible to perform the frame interpolation process only in the area in which a moving picture is actually displayed. Particularly, according to the thirteenth aspect, the data indicating the aspect ratio is used, thereby making it possible to perform the frame interpolation process, removing an image attached to the moving picture for adjusting the aspect ratio (so-called side panel) from the area in which the process is performed. Furthermore, according to the fourteenth aspect, it becomes possible to perform the frame interpolation process, removing an area in which an image for data broadcast from the area in which the process is performed.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
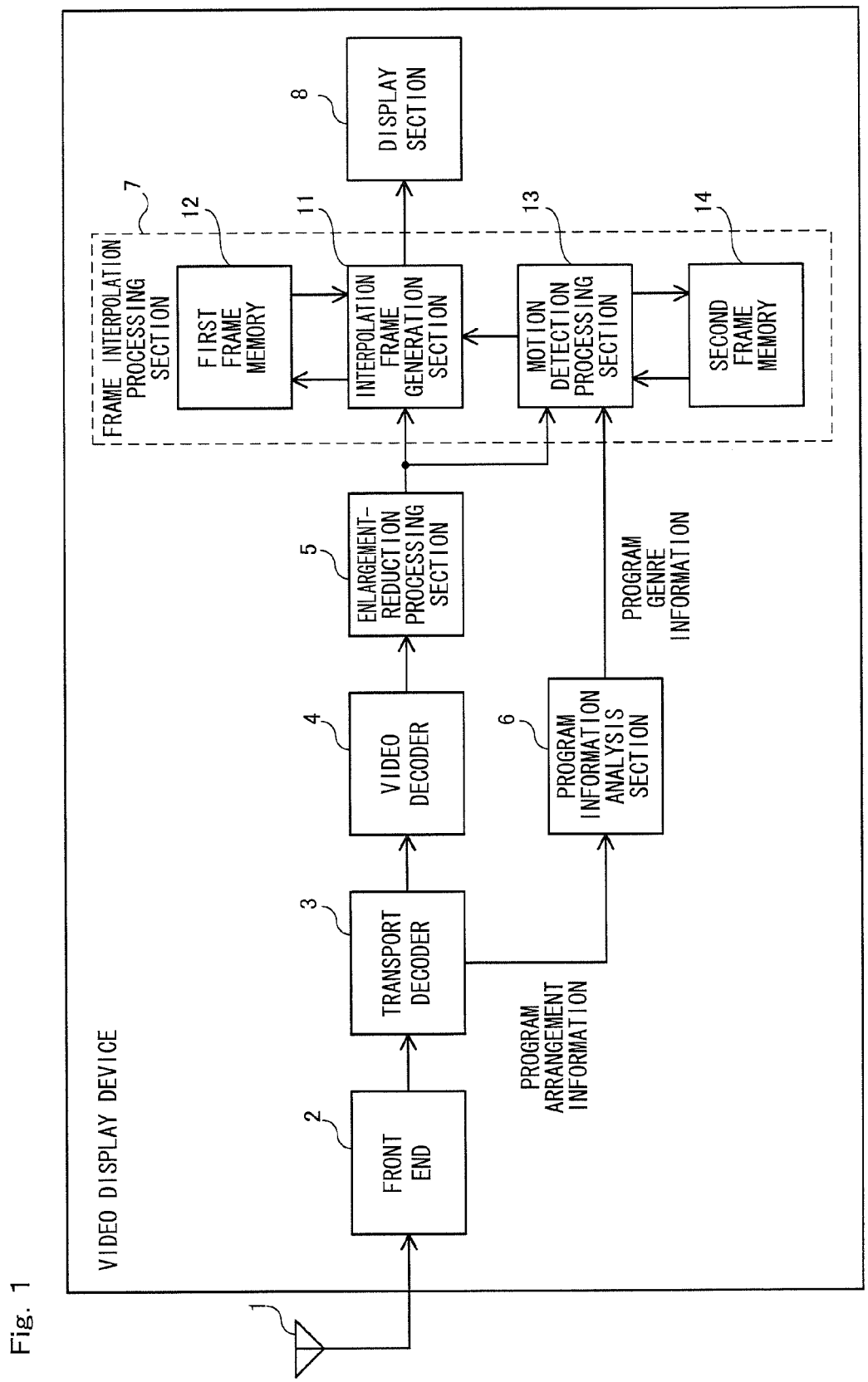
FIG. 1 is a block diagram illustrating a functional configuration of a video display device according to a first embodiment.

Hereinafter, a video display device according to a first embodiment of the present invention will be described. FIG. 1 is a block diagram illustrating a functional configuration of the video display device according to the first embodiment. In FIG. 1, the video display device comprises a front end 2, a transport decoder 3, a video decoder 4, an enlargement-reduction processing section 5, a program information analysis section 6, a frame interpolation processing section 7, and a display section 8. Furthermore, the video display device is connected to an antenna 1. The video display device displays, on the display section 8, a video acquired from a broadcast wave received by the antenna 1. Hereinafter, the respective components included in the video display device will be described.

The antenna 1 receives a broadcast wave (a broadcast signal) so as to be outputted to the front end 2. The front end 2 modulates the broadcast signal received by the antenna 1, thereby generating a transport stream. Note that the front end 2 may function as a tuner. The generated transport stream is outputted to the transport decoder 3. The transport decoder 3 is connected to the front end 2, and decodes the transport stream, thereby extracting (generating) a video stream and an audio stream as well as data of PSI (Program Specific Information) and SI (Service Information). In addition, data for data broadcast (a data broadcast stream), data of subtitles and the like are also extracted by decoding the transport stream. Various types of data generated by the transport decoder 3 are to be used for various processes. However, the present embodiment will mainly describe a process of displaying a video on the display section 8, which pertains to the present invention.

The video decoder 4 is connected to the transport decoder 3, and decodes the video stream mentioned above, thereby generating images of respective frames included in the video stream. Data of the generated images is outputted to the enlargement-reduction processing section 5. The enlargement-reduction processing section 5 performs an enlargement-reduction process on the data of the images outputted from the video decoder 4, and outputs the pieces of image data on which the aforementioned process has been performed to the frame interpolation processing section 7. Note that the details of the enlargement-reduction process will be described in a fourth embodiment to be explained later.

The program information analysis section 6 is connected to the transport decoder 3, and acquires the SI data extracted by the transport decoder 3. In the first embodiment, the program information analysis section 6 analyzes the acquired SI data, so as to extract data of genre information of a program, therefrom. Specifically, in the first embodiment, the data of genre information of a program corresponds to additional data recited in claims, and the program information analysis section 6 corresponds to a data extraction section recited in claims. Note that as prescribed in STD-B10 of ARIB Standards, the genre information of a program is obtained by using a content descriptor included in an EIT (Event Information Table) which is transmitted as SI. The genre information may indicate a rough geare of a program such as "sport", "movie" and "animation", or may indicate a more specific genre (such as "soccer", "baseball" and "golf" which are provided under a genre of "sport", for example). Furthermore, the additional data may be any data as long as the data indicates information regarding a program. Instead of the genre information, information indicating a content of a program or the cast of the program may be used. The data of genre information is outputted to the motion detection processing section 13 included in the frame interpolation processing section 7.

The frame interpolation processing section 7 executes a process (an interpolated frame generation process) of generating an image of an interpolated frame based on the images of the respective frames outputted from the enlargement-reduction processing section 5. The frame interpolation processing section 7 includes an interpolated frame generation section 11, a first frame memory 12, a motion detection processing section 13, and a second frame memory 14.

The motion detection processing section 13 calculates a motion vector by using the image data of each frame outputted from the enlargement-reduction processing section 5. A motion vector is a vector representing a direction and magnitude (movement amount) of motion (movement) of an image. The motion vector may be a vector representing a motion of an entire image, or may be a vector representing, when an image is divided into blocks of a predetermined pixel units (16×16 pixel units or 8×8 pixel units, for example), a movement of each block between frames. The second frame memory 14 is a memory for storing the image data, and is used by the motion detect ion processing section 13 for calculating a motion vector. Note that various calculation methods are used to calculate a motion vector. However, in the present embodiment, any calculation method may be used to calculate a motion vector. Although the details will be described later, in the first embodiment, the motion detection processing section 13 acquires the data of genre information from the program information analysis section 6 and changes a content of a calculation process of a motion vector in accordance with a content of the genre information. Data representing the motion vector calculated by the motion detection processing section 13 is outputted to the interpolated frame generation section 11.

By using the image data of each of the frames outputted from the enlargement-reduction processing section 5 and the data representing the motion vector outputted from the motion detection processing section 13, the interpolated frame generation section 11 generates image data of each interpolated frame to be inserted between the respective frames. Then, the image data of each of the frames outputted from the enlargement-reduction processing section 5 and the generated image data of said each interpolated frame are outputted to the display section 6 so as to be displayed on the display section 8 in a chronological order. Note that the first frame memory 12 is a memory for storing the image data of each of the frames and the image data of said each interpolated frame, and is used by the interpolated frame processing section 11 for generating the image data of each interpolated frame.

The display section 8 is a liquid crystal display device, and displays an image represented by the pieces of image data outputted from the interpolated frame generation section 11. Thus, the display section 8 is capable of displaying a moving picture at a frame rate higher than that of a video source (a video stream included in a broadcast wave), thereby improving so-called blurring of a moving picture.

Next, an operation of the video display device having the configuration mentioned above will be described. Initially, an overall operation of the video display device will be described. In at conventional frame interpolation process, a search range of a motion vector is previously determined. Specifically, when searching for a portion similar to a certain block (a similar portion), the motion detection processing section 13 searches for the similar portion within a predetermined search range centered on a position of the block, without searching for the similar portion within an entire image. This is because a processing load of the frame interpolation processing section is reduced by omitting an unnecessary search process, and an incorrect motion vector is prevented from being calculated as a result of selecting, as the similar portion, a portion substantially different from the block, having been defined as a target block to be compared with.

Meanwhile, programs (video contents) to be broadcast have various types of contents. For example, movement (change) of images is vigorous in some programs, while in others, there is little movement of images. Among programs of a genre of sport, for example, a program of soccer may have relatively vigorous movement of images, while a program of golf may have relatively little movement. In a program in which movement of images is vigorous such as a program of soccer, a search range of a motion-vector is set to be broad to some extent, thereby calculating a correct motion vector and thus making it possible to properly perform a frame interpolation process. On the other hand, in a program in which there is little movement of images, a search range is set to be relatively narrow, thereby making it possible to omit an unnecessary search process and also to prevent an incorrect motion vector from being detected. As such, an appropriate width of the search range is different depending on a content of a video (specifically, depending on whether a content thereof includes vigorous movement of images).

As described above, in the present embodiment, the video display device specifies a genre of a program to be displayed by using the genre information, and determines a search range of a motion vector based on the specified genre. Thus, an appropriate search range can be set depending on a genre, thereby making it possible to properly perform the frame interpolation process in accordance with a genre.

Then, an operation of the video display device will be described in detail with reference to FIG. 2. Hereinafter, the present embodiment will be described assuming that programs are divided into four genres which are soccer, baseball, golf and others, and a different search range is set for each of the genres.

The operations of the front end 2, the transport decoder 3, the video decoder 4 and the enlargement-reduction processing section 5 are the same as described above. Furthermore, as also described above, the program information analysis section 6 extracts the data of genre information of a program from the SI data extracted by the transport decoder 3. Hereinafter, an operation of the frame interpolation processing section 7 will be described mainly with respect to the motion detection processing section 13.

Figure 2:
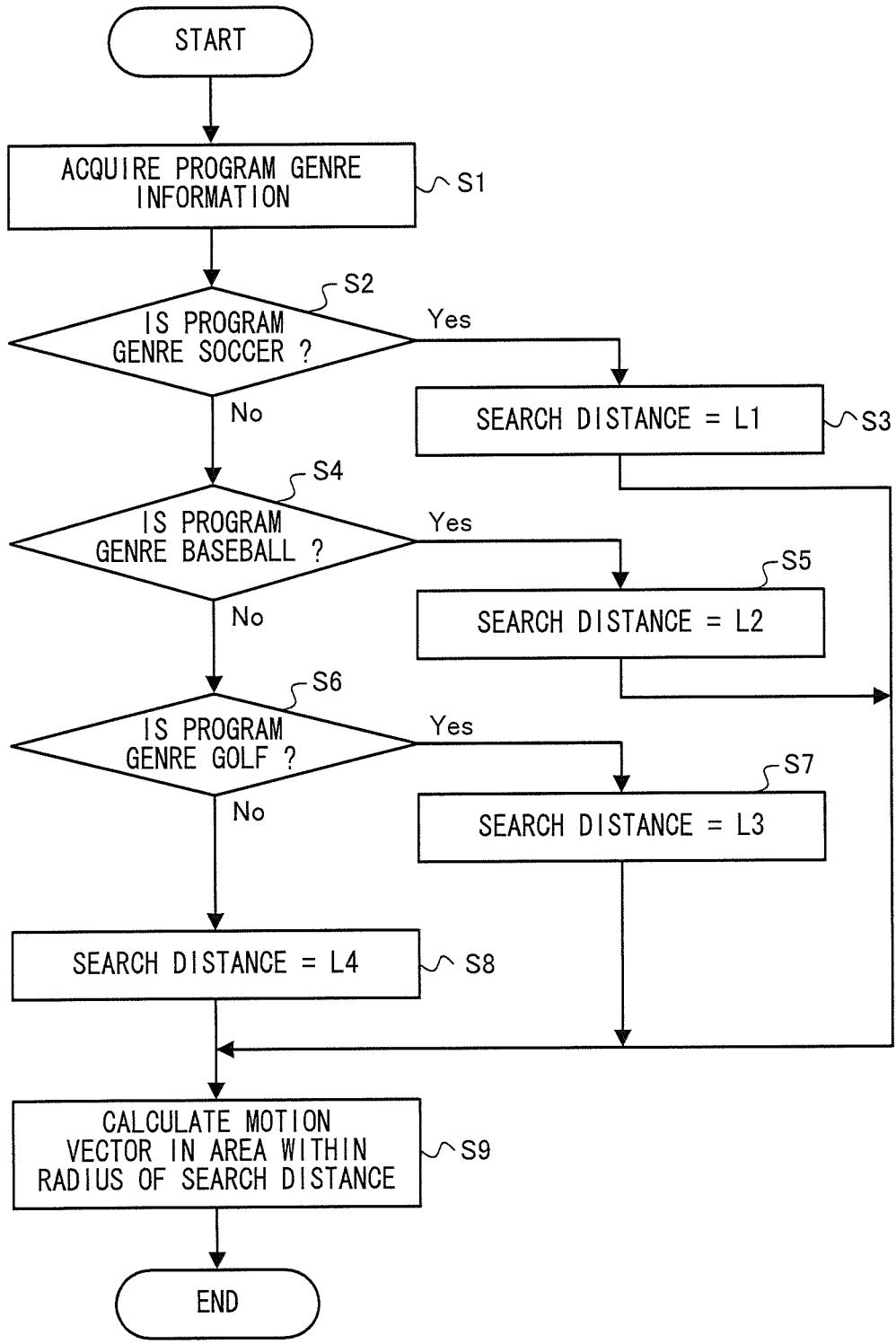
FIG. 2 is a flowchart illustrating a flow of a process executed by the motion detection processing section 13.

FIG. 2 is a flowchart illustrating a flow of a process executed by the motion detection processing section 13. Note that a process from steps S1 to S9 shown in FIG. 2 is executed at a cycle of one frame period. That is, the motion detection processing section 13 executes the process from steps S1 to S9 shown in FIG. 2 each time image data corresponding to one frame is acquired from the enlargement-reduction processing section 5.

Firstly, in step S1, the motion detection processing section 13 acquires the data of genre information of a program from the program information analysis section 6. Specifically, the motion detection processing section 13 issues an acquisition request for genre information to the program information analysis section 6. In response to the acquisition request, the program information analysis section 6 outputs the data of genre information to the motion detection processing section 13. Note that the program information analysis section 6 stores the data of genre information most recently extracted from the SI data which has been extracted by the transport decoder 3. Upon receiving the aforementioned acquisition request, the program information-analysis section 6 outputs the genre information data which is most recently stored.

In a subsequent step S2, the motion detection processing section 13 determines whether or not the data of genre information acquired in step S1 indicates a genre of "soccer". When the determination result in step S2 is Yes, a process of step S3 is executed. On the other hand, the determination result in step S2 is No, a process of step S4 to be described later is executed.

In step S3, the motion detection processing section 13 determines a search distance of a motion vector so as to be equal to a predetermined value L1. Note that the search distance is information for specifying a search range of a motion vector, and in the present embodiment, the search range indicates an area within a radius corresponding to a search distance centered on a position of a target block to which another block is to be compared for searching for a similar portion. In other words, a search range of a motion vector is set by executing the process of step S3. Note that the predetermined value L1 is a value of a search distance suitable for a video of soccer. After step S3, a process of step S9 to be described later is executed.

In step S4, the motion detection processing section 13 determines whether or not the data of genre information acquired in step S1 indicates a genre of "baseball". When the determination result in step S4 is Yes, a process of step S5 is executed. On the other hand, when the determination result in step S4 is No, a process of step S6 to be described later is executed.

In step S5, the motion detection processing section 13 determines a search distance of a motion vector so as to be equal to a predetermined value L2. Note that the search distance L2 is a value of a search distance suitable for a video of baseball. Therefore, in step S5 (in the case where a genre is baseball), a search range is set so as to be different from that was set in step S3 (in the case where a genre is soccer). After step S5, the process of step S9 to be described later is executed.

In step S6, the motion detection processing section 13 determines whether or not the data of genre information acquired in step S1 indicates a genre of "golf". When the determination result in step S5 is Yes, a process of step S7 is executed. On the other hand, when the determination result in step S6 is No, a process of step S8 to be described later is executed.

In step S7, the motion detection processing section 13 determines a search distance of a motion vector so as to be equal to a predetermined value L3. Note that the search distance L3 is a value of a search distance suitable for a video of golf. Therefore, in step S7 (in the case where a genre is golf), a search range is set so as to be different, from that was set in step S3 or step S5 (in the case where a genre is soccer or baseball). After step S7, the process of step S3 to be described later is executed.

In step S8, the motion detection processing section 13 determines a search distance of a motion vector so as to be equal to a predetermined value L4. Note that the search distance L4 is a value of a standard search distance used for videos of general programs other than the aforementioned videos of soccer, baseball and golf. In this state, in step S8 (in the case where a genre is any genre other than soccer, baseball or golf), a search range is set so as to be different from that was set in step S3, S5 or S7 (in the case where a genre is soccer, baseball or golf). After step S8, the process of step S9 to be described later is executed.

In step S9, the motion detection processing section 13 calculates a motion vector within each of the search ranges which were set in steps S3, S7 and S8. Thus, a motion vector is calculated in accordance with a search range varied depending on a genre of a program. Note that except for calculating a motion vector in accordance with each of the search ranges which were determined in steps S3, S5, S7 and S8, the motion detection processing section 13 may execute the same process regardless of any genre of a program. Data of the motion vector calculated in step S9 is outputted to the interpolated frame generation section 11. This is the end of the description of the process executed by the motion detection processing section 13.

Upon calculating the motion vector in such a manner as described above, the interpolated frame generation section 11 generates image data of each interpolated frame to be inserted between the respective frames, by using the image data of said each frame outputted from the enlargement-reduction processing section 5 and the data representing the motion vector outputted from the motion detection processing section 13. Note that any number of interpolated frames may be inserted between two continuous frames. The display section 8, to which the image data of each of the frames outputted from the enlargement-reduction processing section 5 and the generated image data of said each interpolated frame are inputted from the interpolated frame generation section 11, displays an image represented by the pieces of image data. This is the end of the description of the operation of the video display device according to the first embodiment.

According to the first embodiment described above, the video display device acquires data of genre information of a program from SI data included in a broadcast signal (step S1), thereby specifying a genre of the program. Then, a search range of a motion vector is determined so as to be different depending on whether a genre of the program is "soccer", "baseball", "golf" or "others" (steps S2 to S8). Therefore, in the video display device, a motion vector can be calculated within an appropriate search range varied depending on a different genre of a program. In other words, according to the first embodiment, it is estimated whether a content of a program includes vigorous movement of images based on the genre information, whereby an appropriate frame interpolation process can be performed depending on whether the content of the program includes vigorous movement of images or not.

Furthermore, in the above first embodiment, the search range is changed in accordance with a genre of a program. In another embodiment, however, the search precision may also be changed in addition to the search range. For example, when a search is performed within a relatively broad range, the search precision may be set to be relatively low (the search is performed in the unit of ½ pixel, for example), while when a search is performed within a relatively narrow range, the search precision may be set to be relatively high (the search is performed in the unit of ¼ pixel, for example).

The above first embodiment illustrates an example where the search range is changed depending on whether a genre of a program is soccer, baseball, or golf. However, the genres are not limited to those mentioned above. For example, the search range may be set to be relatively broad for programs of a genre of "sport", while a search range may be set to be relatively narrow for programs of any genre except "sport".

Furthermore, in the above first embodiment, the search range of the motion vector is changed in accordance with the additional data. However, in the present invention, any variant may be used as long as a content of a process regarding a motion vector is determined in accordance with a content of the additional data. For example, the following variants are considered.

(First Variant)

In the case where an interpolated frame is generated, the video display device may generate an image of an interpolated frame by blending an image generated by using a motion vector with an image simply interpolated between images of preceding and following frames (an image generated without using a motion vector). In a certain type of video source, there may be a case where an image of an interpolated frame cannot be properly generated even by using a motion vector. As an example of a video source in which an image of an interpolated frame cannot be properly generated, there may be a video source in which a fixed image is superimposed on a moving picture such as a case where character information representing scores is displayed in a video of baseball. In such a video source, an image of an interpolated frame cannot be properly generated even by using a motion vector in an area of the character information. Therefore, in a video source of such a type, it is preferable to perform a simple interpolation rather than performing an interpolation by using a motion vector. As described above, in the first variant, in the case where it is previously recognized in a specific program that there is difficulty in generating an image of an interpolated frame properly even by using a motion vector, a blending ratio of an image generated by using a motion vector is set to be low and a blending ratio of an image generated by performing a simple interpolation is set to be high. Thus, it becomes possible to generate an appropriate interpolated frame even in such a specific program mentioned above.

In the first variant, a degree of influence of a motion, vector, which degree of influence to be exerted on an interpolated frame (i.e., the blending ratio) is changed in accordance with the additional data (information for specifying a program in the present variant). Specifically, in the first variant, the program information analysis section 6 extracts information for specifying a program (i.e., information of a program name) so as to be outputted to the interpolated frame generation section 11. The interpolated frame generation section 11 generates images by using a motion vector and also by performing a simple interpolation. Then, the interpolated frame generation section 11 changes the blending ratio based on the information of the program name outputted from the program information analysis section 6, thereby generating an image of an interpolated frame. In the case where the information of the program name indicates a predetermined program name, an image of an interpolated frame is generated such that the blending ratio of an image generated by performing the simple interpolation is higher, as compared with the case where the information of the program name indicates a program name other than the predetermined program name. For example, in the case where the interpolated frame generation section 11 generates an image of an interpolated frame by dynamically changing the blending ratio in a certain area (in accordance with a video content, for example), the interpolated frame generation section 11 may change the aforementioned area depending on whether or not the information of the program name indicates the predetermined program name.

Furthermore, the interpolated frame generation section 11 may set a plurality of predetermined programs. Specifically, the interpolated frame generation section 11 may store, for each of the plurality of predetermined programs, information with which the blending ratio (or a range within which the blending ratio can be changed in the case where the blending ratio is dynamically changed) is associated, so as to determine the blending ratio in accordance with the information.

The first variant illustrates an example where the video display device changes the blending ratio in accordance with a program name. However, the video display device is capable of changing the blending ratio in accordance with the additional data. For example, in another embodiment, the video display device may change the blending ratio in accordance with a genre of a program. Furthermore, for example, in a third embodiment to be described later, the video display device determines whether or not the frame interpolation process is performed depending on whether a genre of a program is animation or not. However, in another embodiment, in the case where a genre of a program is animation, the blending ratio of an image obtained by performing a simple interpolation may be higher, as compared with the case where a genre of the program is any other genre.

(Second Variant)

In the case where an interpolated frame is generated, a determination process of determining whether each portion included in a video is static or dynamic may be executed. For example, there may be a video source in which a static image such as character information is translucently superimposed on a moving picture. In such a case, for generating an interpolated frame in a proper manner, it may be preferable that the determination criterion for determining whether each portion of a video is static or dynamic is set so as to be different from that used for a normal video. Thus, in a second variant, the criterion for the determination process, i.e., the criterion (threshold value) for determining whether a portion of a video is static or dynamic is changed in accordance with the additional data (information of a program name, for example).

Specifically, in the second variant, information of a program name is extracted so as to be outputted to the interpolated frame generation section 11. Note that the interpolated frame generation section 11 executes the aforementioned determination process when an interpolated frame is generated. For example, the interpolated frame generation section 11 includes a first circuit for detecting a static degree of each portion of a video and a second circuit for detecting a dynamic degree of each portion of the video. The interpolated frame generation section 11 determines whether each portion of a video is static or dynamic based on the detection results obtained by the first and second circuits, thereby changing the content of the interpolated frame generation process in accordance with the determination results. In this case, the interpolated frame generation section 11 changes the detection criterion set in each of the first and second circuits based on the information of the program name outputted from the program information analysis section 6. The detection criterion is, when a portion of a video being static (or dynamic) is represented by a numerical value, for example, a threshold value for determining whether the portion is static (or dynamic). For example, in the case where it is previously recognized that a video source of a specific program is a moving image on which a static image such as character information is translucently superimposed, the interpolated frame generation section 11 may set the detection criterion such that the specific program is determined to be static more easily than other programs.

According to the above second variant, the determination criterion can be appropriately set for a predetermined specific program, thereby making it possible to generate an appropriate interpolated frame depending on a program. Similarly to the first variant, in the second variant, any variant may be used as long as the determination criterion is changed in accordance with the additional data. The determination criterion may be changed in accordance with a genre of a program, other than the information of the program name.

(Third Variant)

In a process of searching for a motion vector, there may be a case where a motion vector is searched for individually in the horizontal and vertical directions of an image. A certain-type of video source such as a video of soccer may have an extremely great amount of horizontal movement with very little vertical movement. In such a video source, a search process (of a motion vector) in the vertical direction is simplified and a search process in the horizontal direction is precisely executed, thereby obtaining a proper interpolated frame and also simplifying the entire search process, and thus the search process is considered appropriate, in a third variant, a content of the search process in each direction is changed in accordance with the additional data (information of a genre of a program, for example).

Specifically, in the third variant, the program information analysis section 6 extracts the genre information of a program so as to be outputted to the motion detection processing section 13. The motion detection processing section 13 changes contents of search processes in the horizontal and vertical directions of an image in accordance with the genre information, of the program. In the present variant, in the case where the genre information of the program indicates a predetermined genre (soccer, for example), the motion detection processing section 13 sets the accuracy of the search process in each of the directions so as to be different from, that used for a normal, case (where the genre information of the program indicates any genre other than the predetermined genre). For example, when the genre information of the program indicates the predetermined genre, the motion, detection processing section 13 sets the accuracy of the search process in the horizontal direction to be relatively high, and sets the accuracy of the search process in the vertical direction to be relatively low. Or when the genre information of the program indicates the predetermined genre, the motion detection processing section 13 may change a search range in each direction (i.e., a search range in the horizontal direction is changed to be relatively broader and a search range in the vertical direction is changed to be relatively narrower).

As described above, according to the third variant, the contents of the search processes in the horizontal and vertical directions of an image can be changed in accordance with a genre of a program, thereby making it possible to generate an appropriate interpolated frame depending on a video source. Note that in the third variant, any variant may be used as long as the contents of the search processes in the horizontal and vertical directions are changed in accordance with the additional data. Similarly to the first variant, the contents of the search processes may be changed in accordance with the information of the program name.

(Fourth Variant)

In a fourth variant, the video display device may change the number of frames to be used for calculating a motion vector in accordance with the additional data. Specifically, the program information analysis section 6 extracts the genre information of a program so as to be outputted to the motion detection processing section 13. The motion detection processing section 13 changes the number of frames to be used for calculating a motion vector in accordance with the genre information of the program. For example, in the above first embodiment, for a genre in which a search range of a motion vector is set relatively broad, the number of frames to be used is set to be small, and for a genre in which a search range of a motion vector is set relatively narrow, the number of frames to be used is set to be large. Thus, for a program in which movement of images is vigorous, the number of frames is set to be small (for compensating for a broad search range), thereby preventing a processing load from becoming excessively large. Also, for a program in which there is little movement of images, the number of frames is set to be large, thereby calculating a motion vector with a high degree of precision.

As described above, according to the fourth variant, the number of frames to be used for calculating a motion vector is changed in accordance with a genre of a program, thereby making it possible to generate an appropriate interpolated frame depending on a video source and also to prevent a processing load from becoming excessively large. Note that in the fourth variant, any variant may be used as long as the number of frames is changed in accordance with the additional data. Similarly to the first variant, the number of frames may be changed in accordance with the information of the program name.

(Fifth Variant)

In a fifth variant, the video display device may change an area in which a motion vector is searched, for intensively (with a nigh degree of precision) in accordance with the additional data. Specifically, the program information analysis section 6 extracts the genre information of a program so as to be outputted to the motion detection processing section 13. The motion detection processing section 13 changes a range within which a motion vector is calculated with a high degree of precision depending on the genre information of the program. For example, in the case where the genre information indicates a specific genre (tennis, for example), the motion detection processing section 13 calculates a motion vector in a predetermined area included in the entire image with a relatively high degree of precision, and calculates a motion vector in an area other than the predetermined area with a relatively low degree of precision. On the other hand, in the case where the genre information indicates any genre other than the specific genre, the motion detection processing section 13 calculates a motion vector within the entire image with the same degree of precision. For example, a video of tennis has a characteristic that while only a ball moves vigorously in the entire image, there is very little movement in other portions. Therefore, in a video of tennis, a motion vector is calculated in an area around the ball with a high degree of precision, thereby making it possible to generate an appropriate interpolated frame, and the calculation precision is lowered in other areas, thereby making it possible to reduce the processing load.

As described above, according to the fifth variant, a range within which a motion vector is searched for with a high degree of precision is changed in accordance with a genre of a program, thereby making it possible to generate an appropriate interpolated frame depending on a video source and also to prevent a processing load from being increased. Note that in the fifth variant, any variant may be used as long as a range within which a motion vector is searched for with a high degree of precision is changed in accordance with the additional data. Similarly to the fourth variant, the aforementioned range may be changed in accordance with the information of the program name, for example.

(Sixth Variant)

In a sixth variant, the video display device may change a size of an object to be detected in the search process of a motion vector in accordance with the additional data. Generally, in the case where a motion vector is searched for, the search process is executed in units of a predetermined number of pixels (blocks). When blocks of a reference number or more move in a collective manner, (the blocks of the reference number or more are detected as one object, and) it is determined that an object moves. In a video of tennis, for example, it is preferable that the reference number is set to be small since a ball is displayed relatively small. In contrast, in a video of soccer or basketball, for example, a ball is displayed relatively large, (whereby an error detection may rather occur if the reference number is set to be smaller than necessary,) and therefore the reference number should be set to be large.

Thus, in the sixth variant, the reference number of determining that an object moves is changed in accordance with the additional data.

Specifically, the program information analysis section 6 extracts the genre information of a program so as to be outputted to the motion detection processing section 13. The motion detection processing section 13 changes a value of the reference number in accordance with the genre information of the program. For example, when the genre information indicates a specific genre (tennis, for example), the motion detection processing section 13 sets the reference number to a relatively small value (four blocks, for example). On the other hand, when the genre information indicates any genre other than the specific genre, the motion detection processing section 13 sets the reference number to a relatively large value (nine blocks, for example). As described above, the reference number is changed in accordance with a genre of a program, thereby setting an appropriate reference number depending on a genre of a program, and thus making it possible to generate an appropriate interpolated frame depending on a video source.

As described above, in the sixth variant, a size to be defined as a collective object in the search process of a motion vector is changed in accordance with a genre of a program, thereby making it possible to generate an appropriate interpolated frame depending on a video source. Note that in the sixth variant, any variant may be used as long as the aforementioned size is changed in accordance with the additional data. Similarly to the fourth variant, the size may be changed in accordance with the information of the program name, for example.

Second Embodiment

Next, the video display device according to a second embodiment will be described. A configuration of the video display device according to the second embodiment is the same as that shown in FIG. 1, and therefore any detailed descriptions of the respective components will be omitted. In the second embodiment, the video display device performs a different frame interpolation process (more specifically, a different calculation process of a motion vector) depending on whether a genre of a program is movie or any other genre.

Figure 3:
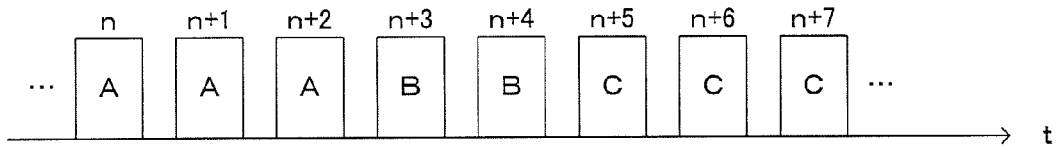
FIG. 3 is a diagram illustrating an example of images of respective frames in the case where a video having 24 frames per second is distributed as a video source having 60 frames per second.

In digital broadcast, a video source having 60 frames per second is distributed. In the case of movie, however, a video having 24 frames per second is generally distributed. Thus, when a content of movie is distributed as a digital broadcast program, the same image may be consecutively used during two or three frames, thereby distributing a video having 24 frames per second as a video source having 60 frames per second. FIG. 3 is a diagram illustrating an example of images of respective frames in the case where a video having 24 frames per second is distributed as a video source having 60 frames per second. In this case, as shown in FIG. 3, a cycle is repeated such that one image (an image A shown in FIG. 3) is used three consecutive times, and then a subsequent image (an image B shown in FIG. 3) is used two consecutive times.

In the above case, even if an interpolated frame between two continuous frames is generated by using the aforementioned frames, images of the two continuous frames may be identical to each other, and thus the blurring of a moving picture cannot be improved. Therefore, in the above case, a target frame to be used for generating an interpolated frame needs to be set as appropriate. Specifically, interpolated frames between an n-th frame and an n+3-th frame, both of which are shown in FIG. 3, are generated by using the image A and image B. Furthermore, interpolated frames between the n+3-th frame and an n+5-th frame, both of which are shown in FIG. 3, are generated by using the image B and an image C.

As described above, in the case where a content of a program is a movie (a video having 24 frames per second), the content of the frame interpolation process needs to be different from that of the frame interpolation process to be executed in the normal case (where a video having 60 frames per second is distributed). Thus, in the second embodiment, the video display device determines whether a content of a program is a movie or not based on the genre information of the program, and executes a different frame interpolation process depending on whether the content of the program is a movie or not. Hereinafter, the detailed operation, of the video display device according to the second embodiment will be described.

The operations of the front end 2, the transport, decoder 3, the video decoder 4, and the enlargement-reduction processing section 5 are the same as those of the first embodiment. Furthermore, similarly to the first embodiment, the program information analysis section 6 extracts the data of genre information of a program from the SI data extracted by the transport decoder 3.

Figure 4:
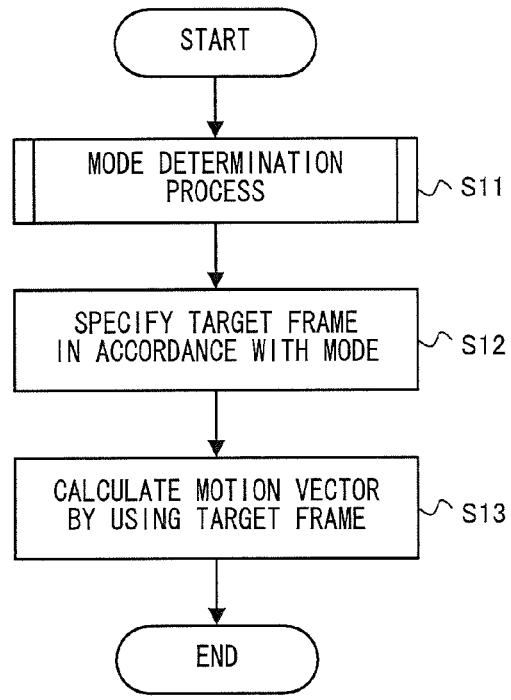
FIG. 4 is a flowchart illustrating a flow of a process executed by the motion defection processing section 13 in a second embodiment.
Figure 5:
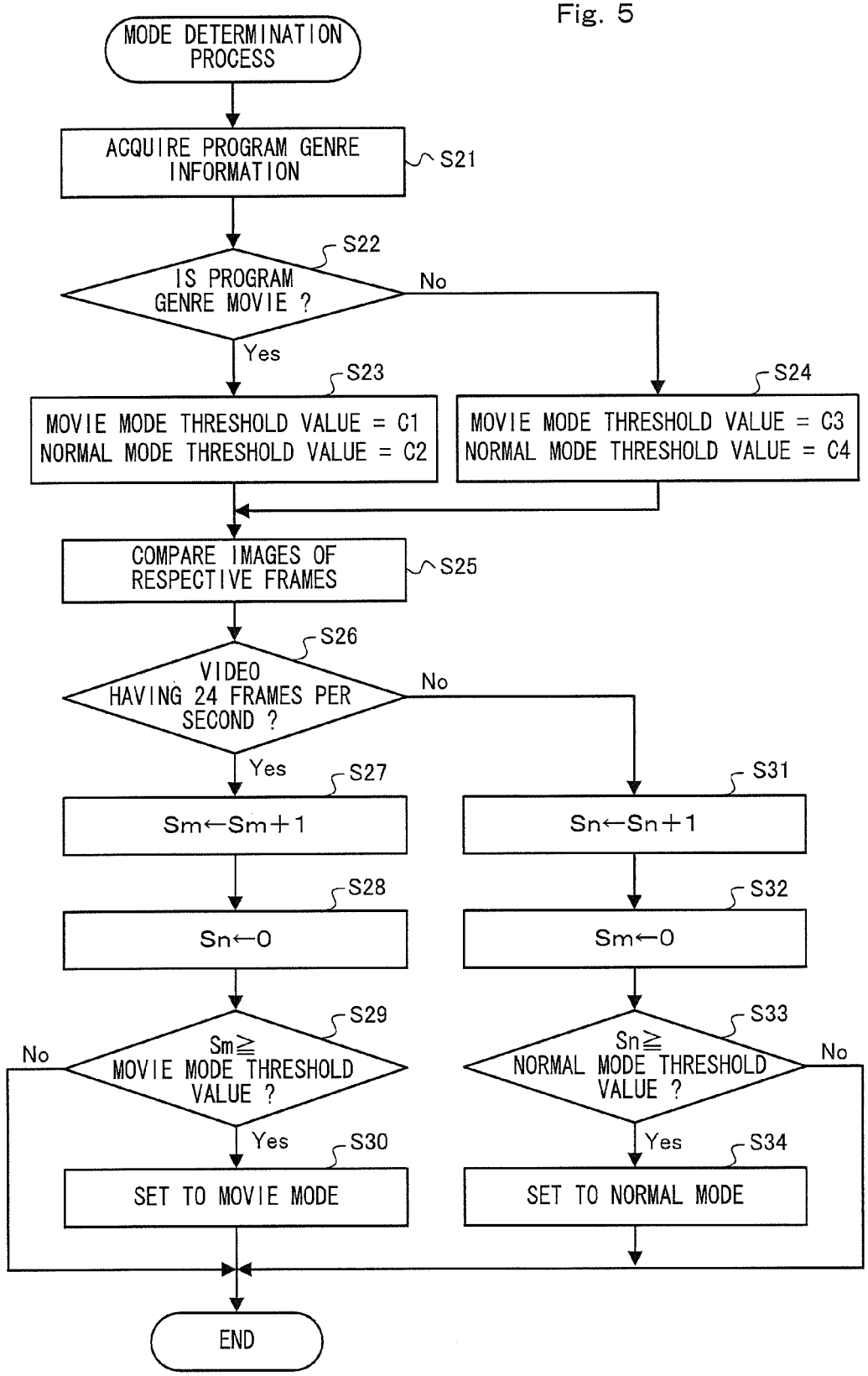
FIG. 5 is a flowchart illustrating the details of step S11 (a mode determination process) shown in FIG. 4.

FIG. 4 and FIG. 5 are flowcharts illustrating flows of a process executed by the motion detection processing section 13. Note that a process from steps S11 to S13 shown in FIG. 4 is executed at a cycle of one frame period.

Firstly, in step S11, the motion detection processing section executes a mode determination process. The mode determination process is a process of determining whether a mode of the frame interpolation process is to be a normal mode or a movie mode. Hereinafter, the details of the mode determination process will be described with reference to FIG. 5.

FIG. 5 is the flowchart illustrating the details of step S11 (mode determination process) shown in FIG. 4. Firstly, in step S21, the motion detection processing section 13 acquires the data of genre information of a program from the program information analysis section 6. In the second embodiment, the data of genre information of a program corresponds to "additional data" recited in claims. A process of step S21 is the same as a process of step S1.

In a subsequent step S22, the motion detection processing section 13 determines whether or not the data of genre information acquired in step S21 indicates a genre of "movie". When the determination result in step S22 is Yes, a process of step S23 is executed. On the other hand, when the determination result in step S22 is No, a process of step S24 to be described, later is executed.

In step S23, the motion detection processing section 13 sets a predetermined value c1 as a threshold value of the movie mode, and also sets a predetermined value c2 as a threshold value of the normal mode. Note that the threshold value of the movie mode is a value used for determining, in step S23 below, whether or not a mode of the frame interpolation process is to be the movie mode. Similarly, the threshold value of the normal mode is a value used for determining, in step S33 below, whether or not a mode of the frame interpolation process is to be the normal mode. After step S23, a process or step S25 is executed.

In step S24, the motion detection processing section 13 sets a predetermined value c3 as the threshold value of the movie mode, and also sets a predetermined value c4 as the threshold value of the normal mode. Note that the predetermined value c3 is greater than the predetermined value c1. Further, the predetermined value c4 may be equal to the predetermined value c2. After step S24, the process of step S25 is executed.

In step S25, the motion detection processing section 13 compares the images of the respective frames acquired from, the enlargement-reduction processing section 5. Specifically, a currently acquired image of a frame is compared with a most recently acquired image of a frame immediately preceding the frame to judge whether the two images are identical to each other, and a comparison result thus obtained is stored.

In a subsequent step S26, the motion detection processing section 13 determines whether or not a video currently being acquired is likely to be a video having 24 frames per second. The determination in step S26 is made by using the comparison result obtained in step S25. That is, whether or not a currently acquired image different from a most recently acquired image is used two consecutive times is determined. When a currently acquired image different from a most recently acquired image is used two consecutive times, it is determined that the image currently being acquired is not likely to be a video having 24 frames per second. On the other hand, when a currently acquired image different from a most recently acquired image is not used two consecutive times, it is determined that the image currently being acquired is likely to be a video having 24 frames per second. When the determination result in step S26 is Yes, a process from steps S27 to S30 is executed. On the other hand, when the determination result in step S26 is No, a process from steps S31 to S34 to be described later is executed. Note that the determination process in step S26 is not a process of determining whether the image currently being acquired is a video having 24 frames per second. In other words, even when the determination result in step S26 is Yes, a mode of the frame interpolation process is not necessarily set to the movie mode.

In steps S27 to S30, a process of determining whether or not a mode of the frame interpolation process is set to the movie mode is executed. Specifically, in step S27, the motion detection processing section 13 increments a first count value Sm in accordance with the number of times a state where an image is used three consecutive times and then a subsequent image is used two consecutive times is repeated in a sequence of frames acquired from the enlargement-reduction processing section 5. The first count value Sm indicates the number of times the aforementioned state is repeated, and is incremented by 1 at a time when one image is used three consecutive times and then a subsequent image is used two consecutive times. The first count value Sm is stored in a memory of the frame interpolation processing section 7.

In a subsequent step S28, the motion detection processing section 13 resets a second count value Sn (i.e., sets the second count value Sn to "0"). Note that the second count value Sn indicates the number of times a state where an image different from an image of an immediately preceding frame is acquired is repeated. The second count value Sn is stored in the memory of the frame interpolation processing section 7.

In a subsequent step S29, the motion detection processing section 13 determines whether or not the first count value Sm is greater than or equal to the threshold value of the movie mode (c1 or c3). When the determination result in step S29 is Yes, a process of step S30 is executed. That is, in step S30, the motion detection processing section 13 sets a mode of the frame interpolation process to the movie mode. On the other hand, when the determination result in step S29 is No, the process of step S30 is skipped and the motion detection processing section 13 finishes the mode determination process.

In step S31, the motion detection processing section 13 increments the second count value Sn by 1. In a subsequent step S32, the motion detection processing section 13 resets the first count value Sm (i.e., sets the first count value Sm to "0"). In a subsequent step S33, the motion detection processing section 13 determines whether or not the second count value Sn is greater than or equal to the threshold value (c2 or c4) of the normal mode. When the determination result in step S33 is Yes, a process of step S34 is executed. That is, in step S34, the motion detection processing section 13 sets a mode of the frame interpolation process to the normal mode. On the other hand, when the determination result in step S29 is No, the process of step S30 is skipped and the motion detection processing section 13 finishes the mode determination process.

As described above, in the mode determination process according to the second embodiment, the motion detection processing section 13 determines whether a genre of a program is movie or not (step S22), and when it is determined that the genre is movie, a threshold value of a movie mode is set to c1 (step S23), while when it is determined that the genre is not movie, the threshold value of the movie mode is set to c3 (step S23). Furthermore, the number of times Sm a state, where an image is used three consecutive times and then a subsequent image is used two consecutive times is repeated, is counted (step S27). Then, when the count value Sm is greater than or equal to the threshold value of the movie mode (Yes in step S29), it is determined that a video currently being received is a movie, and a mode of the frame interpolation process is set to the movie mode (step S30).

Note that when a genre of a program is not movie, it cannot be estimated that a video currently being acquired is a video having 24 frames per second. Thus, it cannot be precisely determined that the video currently being acquired is a video having 24 frames per second unless a state where an image is used three consecutive times and then a subsequent image is used two consecutive times is repeated a certain consecutive number of times. That is, in order to prevent error detection, the predetermined value c3 must be set to a relatively large value. As a result, it takes a considerable time to switch from the normal mode to the movie mode, whereby it is easy for a video to appear unnatural when the switching is performed. On the other hand, when a genre of the program is movie, it can be estimated that a video currently being acquired is highly likely to be a video having 24 frames per second. Therefore, if a state where an image is used three consecutive times and then a subsequent image is used two consecutive times occurs even to a minor extent, there will be no error detection even when it is determined that the video currently being acquired is a video having 24 frames per second. That is, it is certainly acceptable to set the predetermined value to a relatively small value. As described above, the predetermined value c1 can be smaller than the predetermined value c3. In other words, by estimating, based on the genre information of a program, that a video currently being acquired is a video having 24 frames per second, it becomes possible to quickly perform the switching to the movie mode.

Referring back to FIG. 4, in step S12 subsequent to step S11, the motion detection processing section 13 specifies a frame (a target frame) to be used for generating an interpolated frame in accordance with a mode of the frame interpolation process. For example, in the normal mode, two continuous frames are specified as a target frame. Also, in the movie mode, two frames in which images are different from each other are specified as a target frame, as described above (see FIG. 3). Note that when any mode of the frame interpolation process is not set is step S11 (No in step S29 or S33), the motion detection processing section 13 executes a process of step S12 in accordance with a most recent mode having been previously set. Furthermore, in the second embodiment, a mode of the frame interpolation process is set to the normal mode at an initial state.

In a subsequent step S13, the motion detection processing section 13 calculates a motion vector by using the target frame specified in step S12. Thus, a motion vector is calculated so as to be different depending on whether a genre of a program is movie or not. Note that except for calculating a motion vector in accordance with a different target frame, the motion detection processing section 13 may execute the same process regardless of whether a genre of a program is movie or not. Data, of the motion vector calculated in step S13 is outputted to the interpolated frame generation section 11. This is the end of the description of the process executed by the motion detection processing section 13.

Upon calculating the motion vector in such a manner as described above, the interpolated frame generation section 11 generates image data of each interpolated frame to be inserted between the respective frames, by using the image data of each of the frames outputted from the enlargement-reduction processing section 5 and the data representing the motion vector outputted from the motion detection processing section 13. Note that any number of interpolated frames may be inserted between two continuous frames. Furthermore, in the movie mode, the interpolated frame generation section 11 may generate an image of an interpolated frame instead of using an image of a frame outputted from the enlargement-reduction processing section 5, in order to avoid the same image being consecutively displayed. Specifically, taking FIG. 3 as an example, a plurality of interpolated frames may be generated between the n-th frame and the n+3-th frame by using an image of the n-th frame and an image of the n+3-th frame, and the plurality of interpolated frames having been generated may be outputted to the display section 8 without output ting images of an n+1-th frame and an n+2-th frame.

The display section 8, to which the image data of each of the frames outputted from the enlargement-reduction processing section 5 and the generated image data of said each interpolated frame are inputted from the interpolated frame generation section 11, displays an image represented by the pieces of image data. This is the end of the description of the operation of the video display device according to the second embodiment.

As described above, in the second embodiment, the video display device determines whether or not a program is made or a video having 24 frames per second by using the genre information of the program, and performs a different frame interpolation process depending on the determination result. Thus, it becomes possible to allow the video display device to perform an appropriate frame interpolation depending on whether the program is made of a video having 24 frames per second or not. Furthermore, by using the genre information of a program, the determination of whether or not the program is made of a video having 24 frames per second is made quickly, and thus it becomes possible to quickly perform a switching from the normal mode to the movie mode.

In the above second embodiment, whether a content of a program is a movie or not is determined by using the genre information of the program (step S22), and whether a video currently being acquired is a video having 24 frames per second or not is also determined (steps S25 to S29). In other words, by determining whether the video currently being acquired is actually a video having 24 frames per second, a mode can be more precisely determined. For example, even when the genre information indicates movie, there may be a case where a video having 60 frames per second may be distributed via executing a conversion process on the broadcasting station side. In second embodiment, a mode can be precisely determined even in such a case.

Furthermore, in the second embodiment, instead of uniquely determining a mode (i.e., a content of the frame interpolation process) in accordance with the determination result in step S22, the mode is determined by using the determination result in step S29 as well as the determination result in step S22. As described above, in the present invention, any variant may be used as long as the content of the frame interpolation process is determined based on the genre information of a program, and the present invention is not limited to a method in which the content of the frame interpolation process is determined only based on the genre information of the program (in which the content of the process is uniquely determined based on the genre information of the program). In another embodiment, the video display device may uniquely determine a mode in accordance with the determination result in step S22. Specifically, when the genre information of a program indicates movie, a mode may be set to the movie mode, while when the genre information of the program indicates any genre other than movie, the mode may be set to the normal mode.

Third Embodiment

Next, the video display device according to a third embodiment will be described. A configuration of the video display device according to the third embodiment is the same as that shown in FIG. 1, and therefore any detailed descriptions of the respective components will be omitted. In the third embodiment, the video display device switches between a mode where the frame interpolation process (the calculation process of a motion vector) is executed and a mode where no frame interpolation process is executed, depending on whether a genre of a program is animation or any other genre.

As described above, in digital broadcast, a video source having 60 frames per second is distributed. In the case of animation, however, a video having 8 frames per second is generally distributed. In such a case where the actual number of frames included in a video is substantially low, as typified by an animation video, the reliability of a calculated motion vector is low, and therefore it is difficult to properly generate an image of an interpolated frame by performing the frame interpolation process. Thus, in some cases, an improper interpolated frame may be generated, whereby a video may be rather distorted. Particularly, since a video of animation is characterized by clear contours, the video may appear extremely unnatural if frame interpolation cannot be performed properly. Furthermore, it is also considered that another characteristic of animation is rough movement represented by a video having 8 frames per second. Thus, it may be suitable for animation to use a video having 8 frames per second. In view of above, in the third embodiment, when a genre of a program is animation, no frame interpolation process is performed. Hereinafter, the detailed operation of the video display device according to the third embodiment will be described.

The operations of the front end 2, the transport decoder 3, the video decoder 4 and the enlargement-reduction processing section 5 are the same as those of the first embodiment. Furthermore, similarly to the first embodiment, the program information analysis section 6 extracts the data of genre information of a program from the SI data extracted, from the transport decoder 3.

Figure 6:
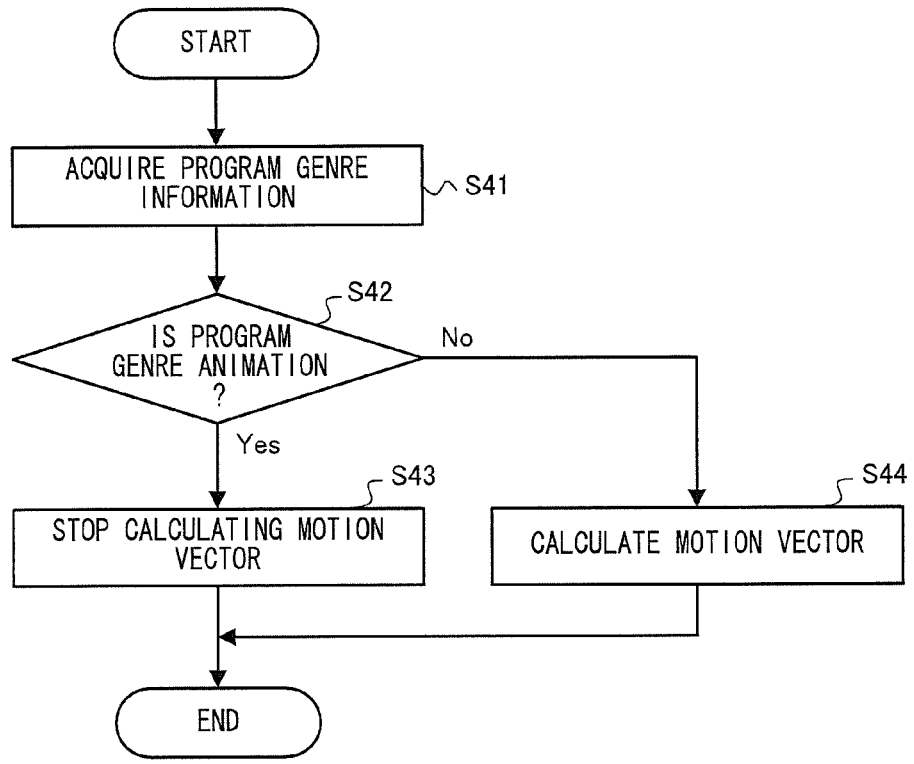
FIG. 6 is a flowchart illustrating a flow of a process executed by the motion detection processing section 13 in a third embodiment.

FIG. 6 is a flowchart illustrating a flow of a process executed by the motion detection processing section 13. Note that a process from steps S41 to S44 is executed at a cycle of one frame period. Firstly, in step S41, the motion detection processing section 13 acquires the data of the genre information of a program from the program information analysis section 6. A process of step S41 is the same as the process of step S1 shown in FIG. 2.

In a subsequent step S42, the motion detection processing section 13 determines whether or not the data of genre information acquired in step S41 indicates a genre of "animation". When the determination result in step S42 is Yes, a process of step S43 is executed. On the other hand, when the determination result in step S42 is No, a process of step S44 to be described, later is executed.

In step S43, the motion detection processing section 13 stops calculating a motion vector. Specifically, when a genre of the program is animation, the motion detection processing section 13 does not calculate any motion vector. On the other hand, in step S44, the motion detection processing section 13 calculates a motion vector. Any calculation method may be used to calculate a motion vector in step S44. Data of the motion vector calculated in step S44 is outputted to the interpolated frame generation section 11. After steps S43 or S44, the motion detection processing section 13 finishes the process shown in FIG. 6.

In the third embodiment, the interpolated frame generation section 11 generates image data of each interpolated frame only when the data of the motion vector is outputted from the motion detection processing section 13. In this case, the interpolated frame generation section 11 outputs the image data of each of the frames outputted from the enlargement-reduction processing section 5 and the generated image data of said each interpolated frame to the display section 8, so as to be displayed on the display section 8 in a chronological order. When no data of motion vector is outputted from the motion detection processing section 13, the interpolated frame generation section does not generate any image data of interpolated frames. In this case, the interpolated frame generation section 11 outputs the image data of each of the frames outputted from the enlargement-reduction processing section 5 to the display section 8, so as to be displayed on the display section 8 in a chronological order.

As described above, according to the third embodiment, whether the frame interpolation process is performed or not is determined based on whether a genre of a program is animation or not. Thus, no frame interpolation process is performed on a video of a genre of animation where the frame interpolation process is difficult to be performed, and the frame interpolation process is performed on videos of any other genres. In another embodiment, when a genre of a program is animation, a motion vector may be calculated within an entire image so as to perform the frame interpolation process, instead of not performing the frame interpolation process at all.

Fourth Embodiment

Next, the video display device according to a fourth embodiment will be described. In the fourth embodiment, moving picture area information and aspect ratio information are used instead of the genre information of a program. The content of the frame interpolation process (specifically, a search range of a motion vector) is determined based on the moving picture area information and the aspect ratio information.

Figure 7:
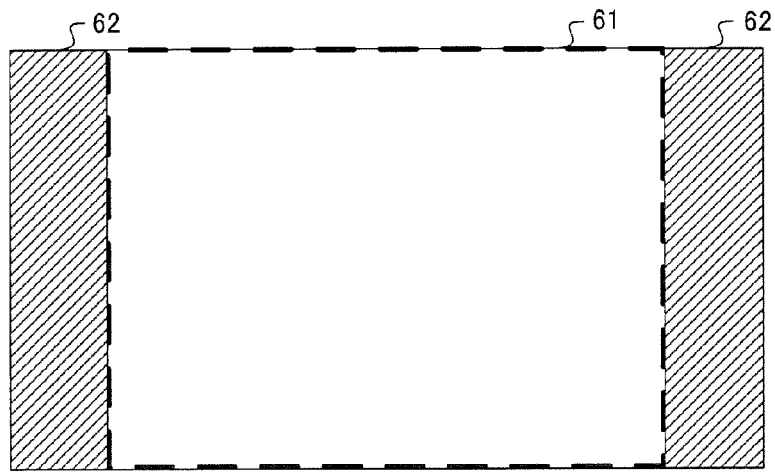
FIG. 7 is a diagram illustrating an exemplary image displayed on a display section of the video display device.
Figure 8:
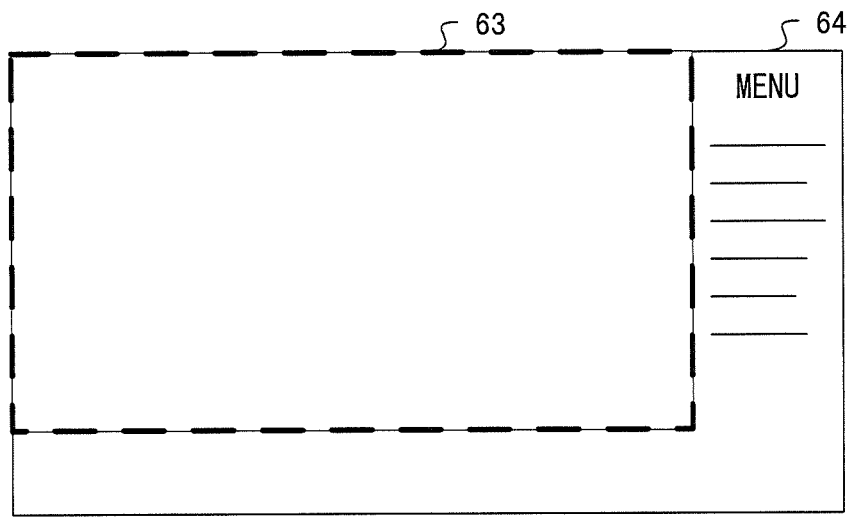
FIG. 8 is a diagram illustrating an exemplary image displayed on the display section of the video display device.
Figure 9:
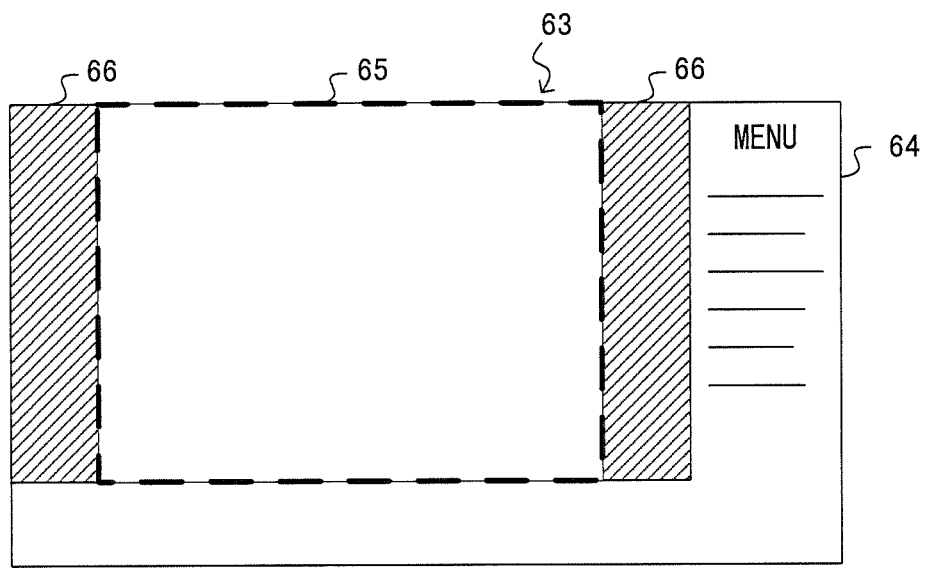
FIG. 9 is a diagram illustrating an exemplary image displayed on the display section of the video display device.

FIGS. 7 to 9 are diagrams illustrating exemplary images displayed on the display section of the video display device. In digital broadcast, there may be a video source in which a size of a moving picture (aspect ratio) is 16:9, or there also may be a video source in which a fixed image (so-called side panel) is attached to each of the left and right sides of a moving picture having a size of 4:3. In an example shown in FIG. 7, a moving picture having a size of 4:3 is displayed in an area 61, and a side panel is displayed in an area 62 on each of the left and right sides of the area 61. Furthermore, in digital broadcast, as shown in FIG. 8, an image for data broadcast also can be displayed together with an image generated based on a video stream. In an example shown in FIG. 8, an image represented by image data included in a video stream is displayed in an area 63, and an image representing a content of data broadcast, is displayed in an area 64. Furthermore, as shown in FIG. 9, there may be a case where an image, in which a side panel is attached to each of the left and right sides of a moving picture having a size of 4:3, is displayed in the area 63 shown in FIG. 8. In this case, the area 63 is divided into areas 65 and 66, the moving picture having a size of 4:3 is displayed in the area 65, and the side panel is displayed in the area 66 on each of the left and right sides of the area 65. Note that in FIGS. 7 to 9, an area in which a moving picture is actually displayed (an area in which the image represented by the image data included in the video stream) is shown by a dotted line.

As shown in FIGS. 7 to 9, an area in which a moving picture is actually displayed is different depending on a program, and an appropriate frame interpolation process is different depending on a position at which the aforementioned area is located in an entire area and a size thereof. Specifically, the frame interpolation process (search process of a motion vector) is performed only in the aforementioned area. Thus, the frame interpolation process is performed only in a necessary area (i.e., a moving picture area), thereby making it possible to simplify the frame interpolation process. In the fourth embodiment, an area in which a moving picture is actually displayed is specified based on information included in a broadcast signal (the aspect ratio information and the moving picture area information to be described later), thereby performing the frame interpolation process on the area. Hereinafter, an area in which a moving picture is actually displayed and on which the frame interpolation process is performed is referred to as a "target area".

Figure 10:
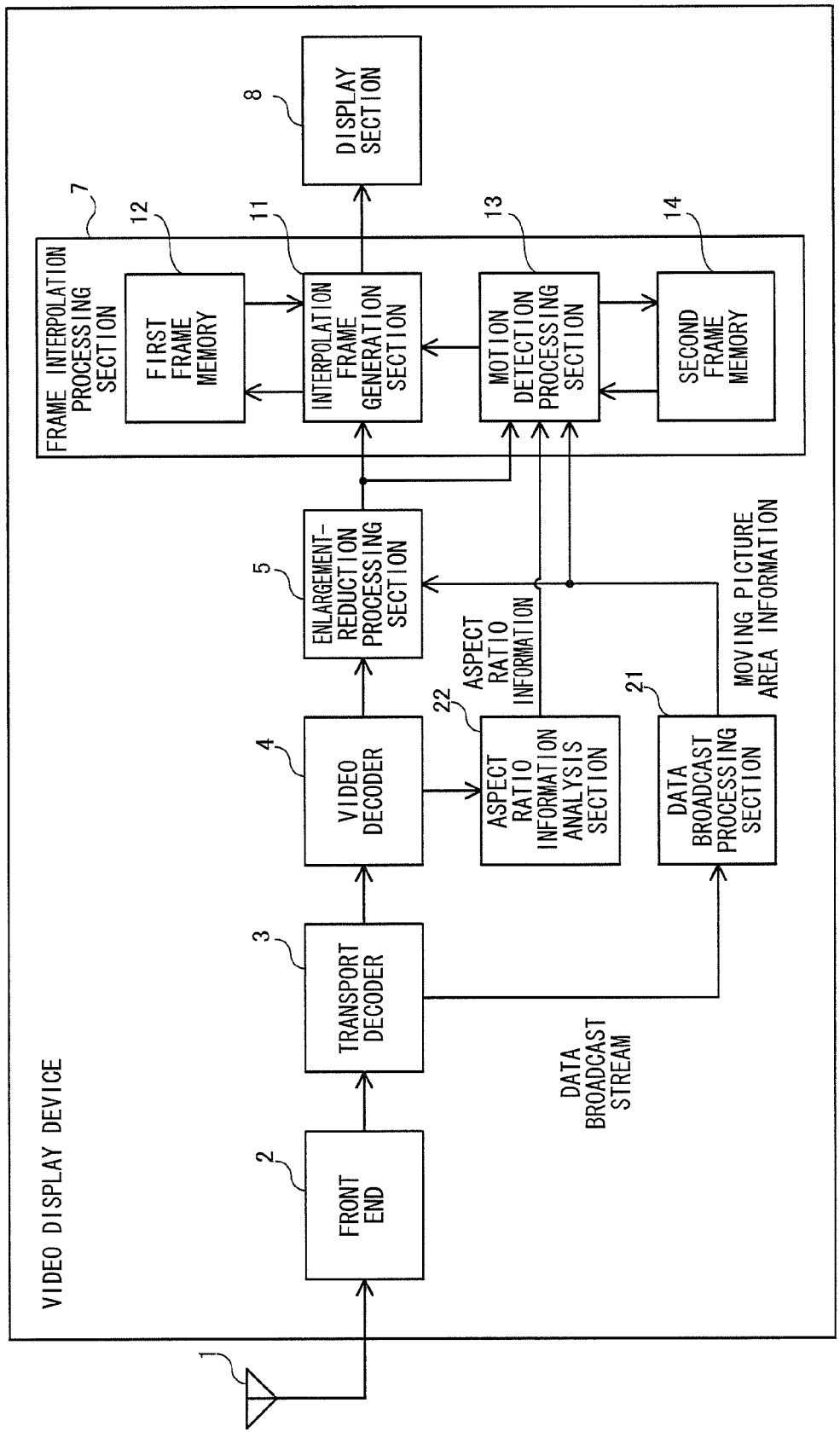
FIG. 10 is a block diagram illustrating a functional configuration of the video display device according to a fourth embodiment.

FIG. 10 is a block diagram illustrating a functional configuration of the video display device according to a fourth embodiment. In the fourth embodiment, the video display device comprises the front end 2, the transport decoder 3, the video decoder 4, the enlargement-reduction processing section 5, the frame interpolation processing section 7, the display section 8, a data broadcast processing section 21, and an aspect ratio information analysis section 22. Note that in FIG. 10, the same components as those shown in FIG. 1 are denoted by the same reference numerals, and any detailed descriptions thereof will be omitted.

The data broadcast processing section 21 is connected to the transport decoder 3, and acquires the data for data broadcast (data broadcast stream) extracted by the transport decoder 3. Also, the data broadcast processing section 21 executes a process of displaying an image for data broadcast. Furthermore, in the fourth embodiment, the data broadcast processing section 21 extracts data of the moving picture area information and scaling rate information from the data broadcast stream. Note that the moving picture area information is information for specifying, when an image representing a content of data broadcast, is displayed together with a moving picture represented by the video stream, an area in which the moving picture is displayed. Specifically, the moving picture area information indicates a position and size of an area, included in a screen area of the display section 8, in which a moving picture is displayed. The scaling rate information indicates a scaling rate used when scaling is performed on an original image. Data representing the moving picture area information is outputted to the enlargement-reduction processing section 5 and the motion detection processing section 13. Data representing the scaling rate information is outputted to the enlargement-reduction processing section 5. In the fourth embodiment, the aforementioned two pieces of data representing the moving picture area information and the scaling rate information correspond to area specification data (additional data) recited in claims, and the data broadcast processing section 21 corresponds to a data extraction section recited in claims. Note that the detailed operation of the data broadcast processing section 21 will be described later (see FIG. 11).

The aspect ratio information analysis section 22 is connected to the video decoder 4, and acquires the aspect ratio information included in the video stream from the video decoder 4. The aspect ratio information is information for specifying an aspect ratio of a video. Note that in digital broadcast, when an original video having an aspect ratio of 4:3 is transmitted as a video having an aspect ratio of 16:9, which is the case as shown in FIG. 7, or when an original video having an aspect ratio of 16:9 is transmitted as a video having an aspect ratio of 4:3, ARIB TR-B15 requires a parameter to be designated as "sequence_header" or "sequence_display_extension" included in a video stream. Therefore, the aspect ratio information analysis section 22 extracts the parameter and analyzes the extracted parameter, thereby making it possible to acquire the aspect ratio information of a video. The aspect ratio information analysis section 22 outputs data of the aspect ratio information to the motion detection processing section 13.

Next, the detailed operation of the video display devotee will be described. The operations of the front end 2, the transport decoder 3 and the video decoder 4 are the same as those of the first embodiment. Also, the aspect ratio information analysis section 22 outputs the data of the aspect ratio information to the motion detection processing section 13, as described above.

Figure 11:
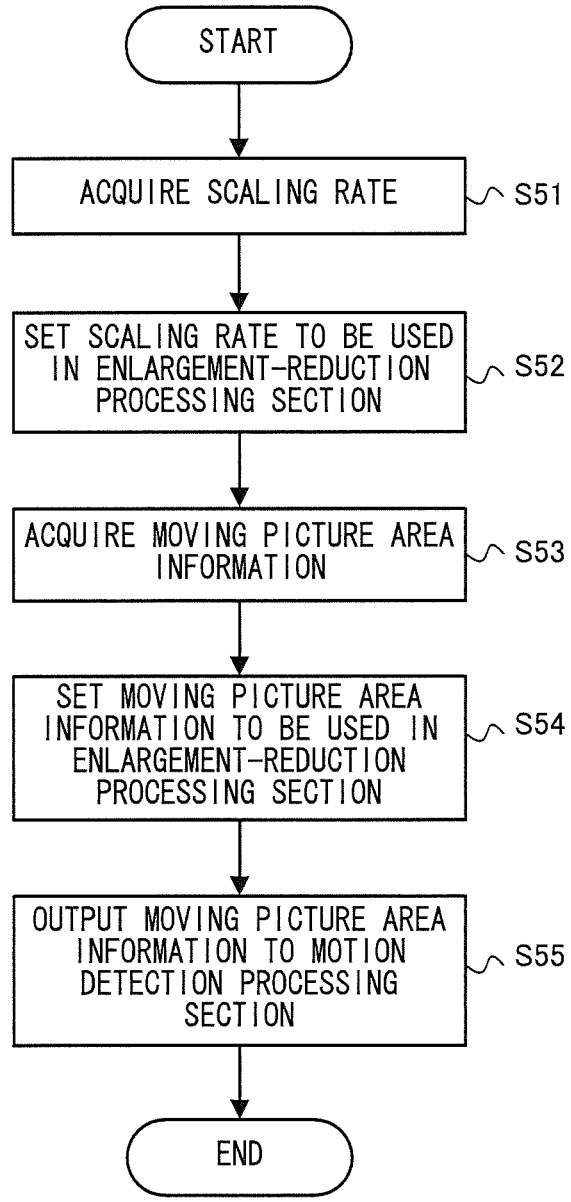
FIG. 11 is a flowchart illustrating a flow of a process executed by a data broadcast processing section 21.

FIG. 11 is a flowchart illustrating a flow of a process executed by the data broadcast processing section 21. Among processes regarding data broadcast executed by the data broadcast processing section 21, FIG. 11 mainly shows a process which pertains to the present invention, and any processes which do not pertain to the present invention are omitted. The process shown in FIG. 11 may be repeatedly executed each time the scaling rate information and moving picture area information are acquired, or may be executed at a predetermined time interval.

Firstly, in step S51, the data broadcast processing section 21 acquires the scaling rate information from a data broadcast stream extracted by the transport decoder 3. In a subsequent step S52, the data broadcast processing section 21 sets the scaling rate information acquired in step S51 so as to be used in the enlargement-reduction processing section 5.

In step S53 subsequent to step S52, the data broadcast processing section 21 acquires the moving picture area information from the data broadcast stream extracted by the transport decoder 3. In a subsequent step S54, the data broadcast processing section 21 sets the moving picture area information acquired in step S53 so as to be used in the enlargement-reduction processing section 5. Furthermore, in step S55, the data broadcast processing section 21 outputs the moving picture area information acquired in step S53 to the motion detection processing section 13. After step S55, the data broadcast processing section 21 finishes the process shown in FIG. 11.

Upon acquiring the scaling rate information and the moving picture area information from the data broadcast processing section 21, the enlargement-reduction processing section 5 performs an enlargement-reduction process on image data outputted from the video decoder 4, in accordance with the scaling rate information and the moving picture area information. Then, the image data on which the enlargement-reduction process has been performed is outputted to the frame interpolation processing section 7.

Figure 12:
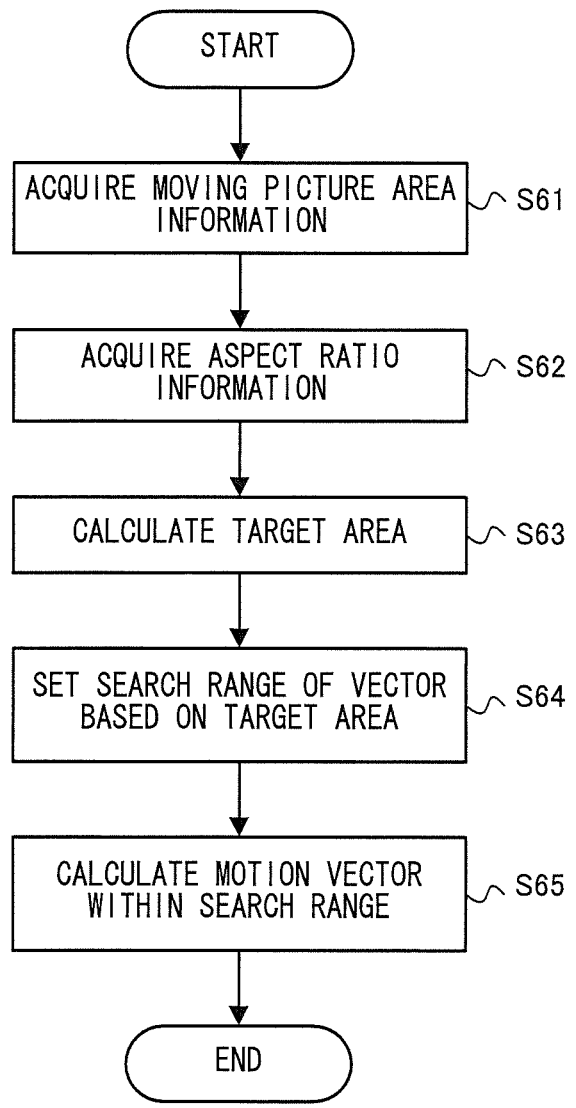
FIG. 12 is a flowchart illustrating a flow of a process executed by the motion detection processing section 13.

FIG. 12 is a flowchart illustrating a flow of a process executed by the motion detect ion processing section 13. Note that a process from steps S61 to S65 is executed at a cycle of one frame period.

Firstly, in step S61, the motion detection processing section 13 acquires data of moving picture area information from the data broadcast processing section 21. Specifically, the motion detection processing section 13 issues an acquisition request for the moving picture area information to the data broadcast processing section 21. In response to the acquisition request, the data broadcast processing section 21 outputs data of the moving picture area information to the motion detection processing section 13. Note that the data broadcast processing section 21 stores the data of the moving picture area information most recently extracted from the data broadcast stream which has been extracted by the transport decoder 3. Upon receiving the aforementioned acquisition request, the data broadcast processing section 21 outputs the data of the moving picture area information which is most recently stored.

In a subsequent step S62, the motion detection processing section 13 acquires data of the aspect ratio information from the aspect ratio information analysis section 22. Specifically, the motion detection processing section 13 issues an acquisition request for the aspect, ratio information to the aspect ratio information analysis section 22. In response to the acquisition request, the aspect ratio information analysis section 22 outputs data of the aspect ratio information to the motion detection processing section 13. Note that the aspect ratio information analysis section 22 stores the data of the aspect ratio information most recently extracted from the video stream. Upon receiving the aforementioned acquisition request, the aspect ratio information analysis section 22 outputs the data of the aspect ratio information which is mostly recently stored.

In step S63, the motion detection processing section 13 calculates the aforementioned target area, that is, an area, included in a screen area, in which a moving picture is actually displayed. Specifically, the motion detection processing section 13 determines whether or not a mode where an image for data broadcast is displayed is set. Note that a switching is performed, in accordance with an instruction of a user, between a mode where an image for data broadcast is displayed and a mode where the image for data broadcast is not displayed. When the mode where an image for data broadcast is displayed is set, the motion detection processing section 13 reads the moving picture area information, thereby specifying an area in which an image represented by video data is displayed (referred to as a video data area). On the other hand, when the mode where an image for data broadcast is not displayed is set, an entire area of an image to be displayed is set as the video data area. Open specifying the video data area in such a manner as described above, the motion detection processing section 13 then reads the aspect ratio information, thereby determining the target area based on an aspect ratio of an image. Specifically, when an aspect ratio is 16:9, a target area is to be a video data area. This is because in this case, a moving picture is actually displayed in the entire area of the video data area. On the other hand, when an aspect ratio is 4:3, a target area is set as an area, included the video data area, from which a predetermined area on each of the left and right sides is removed. This is because in this case, the predetermined area included in the video data area is an area in which the side panel is displayed, and any moving picture is not to be displayed in this area.

In step S64, the motion detection processing section 13 sets a search range of a motion vector based on the target area calculated in step S63. Specifically, a search range is set as the interior of the target area. In a subsequent step S65, the motion detection processing section 13 calculates a motion vector within the search range set in step S64. Thus, a motion vector is calculated in accordance with a search range varied depending on a position and size of the target area. That is, a motion vector is calculated only within a search range in which a moving picture is actually displayed. Note that except for calculating a motion vector in accordance with the search range set in step S64, the motion detection processing section 13 may execute the same process regardless of any target area. Data of the motion vector calculated in step S65 is outputted to the interpolated frame generation section 11. This is the end of the description of the process executed by the motion detection processing section 13.

Upon calculating a motion vector in such a manner as described above, the interpolated frame generation section 11 generates image data of each interpolated frame to be inserted between the respective frames, by using the image data of each of the frames outputted from the enlargement-reduction processing section 5 and the data representing the motion vector outputted from the motion detection processing section 13. In this case, the interpolated frame generation section 11 may generate said each interpolated frame only in the target area. The display section 8, to which the image data oil each of the frames outputted from the enlargement-reduction processing section 5 and the generated image data of said each interpolated frame outputted from the interpolated frame generation section 11, displays an image represented by the pieces of image data. This is the end of the description of the operation of the video display device according to the fourth embodiment.

As described above, according to the fourth embodiment, the video display device specifies the area in which a moving picture is actually displayed (the aforementioned target area) by acquiring the moving picture area information and the aspect ratio information. Then, a search range of a motion vector is set in the area. Thus, no search process of a motion vector is performed in an unnecessary area for the search, thereby making it possible to effectively perform the frame interpolation process in accordance with a position and size of the area in which a moving picture is actually displayed.

Note that in the fourth embodiment above, as the area specification data for specifying an area, included in an entire area of an image to be displayed on a display device, in which a moving picture is displayed, the both pieces of data of the moving picture area information and the aspect ratio information are used to calculate a target area. In another embodiment, either of the moving picture area information and the aspect ratio information may be used to calculate a target area. For example, when only the moving picture area information is used to calculate a target area, the motion detection processing section 13 specifies the video data area (see step S63) based on the moving picture area information, and the video data area is set as a target area. Alternatively, when only the aspect ratio information is used to calculate a target area, the motion detection processing section 13 specifies a video data area by using any method, and then determines a target area from the video data area in a similar manner to that in step S63.

Note that the above first to fourth embodiments illustrate a case where a frame interpolation process is performed for the purpose of improving blurring of a moving picture displayed by a liquid crystal display device. However, the present invention is not limited to the frame interpolation process to be performed for the above purpose. For example, the present invention is applicable to a frame interpolation process to be performed when a frame rate of a video is changed to another frame rate. Furthermore, the present invention is applicable, not limited to a liquid crystal display device, to display devices of other types in which blurring occurs in moving pictures, for example. Furthermore, in a PDP (plasma display panel), a subframe (sub-field) may be generated as an interpolated frame. However, the present invention is also applicable to a case where a subframe is generated in the PDF.

As described above, the present invention is applicable to a video display device and the like that displays a video distributed through broadcast for the purpose of performing an appropriate frame interpolation process depending on a content of a video source and the like.

While the invention has been described in detail, the foregoing description is in all aspects illustrative and not restrictive. It is understood that numerous other modifications and variations can be devised without departing from the scope of the invention.

What is claimed is:

1. A video display device that displays a video distributed via broadcast, the video display device comprising:
   a data extraction section for extracting additional data indicating information regarding a program or regarding a video of the program from a broadcast signal; and
   a frame interpolation processing section for generating an image of an interpolated frame based on images, of respective frames, represented by video data extracted from the broadcast signal and a content of the additional data,
   wherein the frame interpolation processing section determines, in accordance with vigorousness of movement between the images of the respective frames estimated based on the content of the additional data, at least a search range of a motion vector to be used for generating the image of the interpolated frame,
   wherein the data extraction section extracts, as the additional data, area specification data for specifying an area, included in an entire area of images to be displayed on a display device, in which a moving picture is displayed,
   wherein the frame interpolation processing section executes a calculation process of the motion vector only in the area specified by the area specification data,
   wherein the area specification data indicates an area, included in the entire area of each of the images to be displayed on the display device, in which each of the images represented by the video data is displayed, and
   wherein the frame interpolation processing section determines, based on the area specification data, the area in which the calculation process of the motion vector is executed.

2. An interpolated image generation circuit which generates an image of an interpolated frame based on images distributed via broadcast, the interpolated image generation circuit comprising:
   a data extraction section for extracting additional data indicating information regarding a program or a video of the program from a broadcast signal; and
   a frame interpolation processing section for generating the image of the interpolated frame based on the images, of respective frames, represented by video data extracted by the broadcast signal and a content of the additional data,
   wherein the frame interpolation processing section determines, in accordance with vigorousness of movement between the images of the respective frames estimated based on the content of the additional data, at least a search range of a motion vector to be used for generating the image of the interpolated frame,
   wherein the data extraction section extracts, as the additional data, area specification data for specifying an area, included in an entire area of images to be displayed on a display device, in which a moving picture is displayed,
   wherein the frame interpolation processing section executes a calculation process of the motion vector only in the area specified by the area specification data,
   wherein the area specification data indicates an area, included in the entire area of each of the images to be displayed on the display device, in which each of the images represented by the video data is displayed, and
   wherein the frame interpolation processing section determines, based on the area specification data, the area in which the calculation process of the motion vector is executed.

3. An interpolated image generation method which generates an image of an interpolated frame based on images distributed via broadcast, the interpolated image generation method comprising:
   a data extraction step of extracting additional data indicating information regarding a program or a video of the program from a broadcast signal; and
   a frame interpolation processing step of generating the image of the interpolated frame based on the images, of respective frames, represented by video data extracted from the broadcast signal and a content of the additional data,
   wherein in the frame interpolation processing step, at least a search range of a motion vector to be used for generating the image of the interpolated frame is determined in accordance with vigorousness of movement between the images of the respective frames estimated based on the content of the additional data,
   wherein in the data extraction step, area specification data for specifying an area, included in an entire area of images to be displayed on a display device, in which a moving picture is displayed is extracted as the additional data,
   wherein in frame interpolation processing step, a calculation process of the motion vector is executed only in the area specified by the area specification data,
   wherein the area specification data indicates an area, included in the entire area of each of the images to be displayed on the display device, in which each of the images represented by the video data is displayed, and
   wherein in the frame interpolation processing step, the area in which the calculation process of the motion vector is executed is determined based on the area specification data.

* * * * *